United States Patent
Chasen

(10) Patent No.: US 6,937,814 B1
(45) Date of Patent: Aug. 30, 2005

(54) SYSTEM AND METHOD FOR PLAY WHILE RECORDING PROCESSING

(75) Inventor: Jeffrey M. Chasen, Redmond, WA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 09/549,988

(22) Filed: Apr. 14, 2000

(51) Int. Cl.[7] .............................................. H04N 5/91
(52) U.S. Cl. ..................... 386/46; 386/68; 386/126; 369/30.23
(58) Field of Search .................. 386/46, 68, 125–126, 386/82; 380/201; 369/30.23

(56) References Cited

U.S. PATENT DOCUMENTS

| | | | | |
|---|---|---|---|---|
| 5,414,688 A | * | 5/1995 | Inokuchi | ................... 369/47.12 |
| 5,436,875 A | * | 7/1995 | Shinada | .................... 369/30.23 |
| 5,577,266 A | * | 11/1996 | Takahisa et al. | ........... 455/3.06 |
| 5,724,646 A | * | 3/1998 | Ganek et al. | .................. 725/89 |
| 5,917,910 A | * | 6/1999 | Ishiguro et al. | ............. 380/201 |
| 6,018,612 A | * | 1/2000 | Thomason et al. | ........... 386/82 |
| 6,169,842 B1 | * | 1/2001 | Pijnenburg et al. | ........... 386/46 |
| 6,233,389 B1 | * | 5/2001 | Barton et al. | .................. 386/46 |
| 6,240,244 B1 | * | 5/2001 | Ikeda | .......................... 386/125 |
| 6,327,418 B1 | * | 12/2001 | Barton | ......................... 386/46 |
| 6,438,315 B1 | * | 8/2002 | Suzuki et al. | ................. 386/95 |

FOREIGN PATENT DOCUMENTS

| | | |
|---|---|---|
| JP | 07249271 | 9/1995 |
| WO | WO 99/33265 | 7/1999 |
| WO | WO 01/35405 A1 | 5/2001 |

OTHER PUBLICATIONS

Internet web site page entitled "What is tivo?, " printed Oct. 9, 2000 from http address www.tivo.com/what/intro.html.

\* cited by examiner

*Primary Examiner*—Vincent Boccio
(74) *Attorney, Agent, or Firm*—Steven C. Stewart; Schwabe, Williamson & Wyatt, P.C.

(57) ABSTRACT

A system and method of the present invention allow the playback of recorded data as the data is being recorded. Data is read from a source location, converted into an encoded format and stored in a database. At the same time, the stored data is read from the database, and played as the data is being recorded.

24 Claims, 7 Drawing Sheets

SYSTEM AND METHOD FOR PLAY WHILE RECORDING PROCESSING

FIELD OF THE INVENTION

The present system and method relate to the processing of data.

BACKGROUND

The increase in the use of digital technology as well as the vast improvements in encoding and decoding technology have led to a high demand for audio, video, and other types of data. In response to this demand, audio data, for example, is being provided to the public through a wide variety of formats such as Compact Discs (CDs), Digital Video Discs (DVDs), MP3 files, WAV files, and so forth. This variety affords great flexibility for accessing audio data.

While this flexibility allows users to listen to, receive, and use data, such as music data, using a variety of format systems, it is inconvenient for the user to obtain multiple copies of the same data in differing formats. For example, a user may have a song on an audio CD that he wants to listen to using his MP3 player. The user must first convert the song from CD to MP3 format or obtain a copy of the song in both formats.

Conventional recording approaches allow the user to convert a song from a CD to a variety of digital data formats that can then be stored on the user's computer. For example, a user may convert a song from an audio CD to an MP3 format using a variety of programs. It is common for a user to record a song from audio CD to digital data format. After the song has been recorded the user can listen to the song, for example, by using a computer and a program that plays the digital data format.

One common problem is that conventional recording approaches require tediously long time periods, forcing the user to wait for the recording to finish before being allowed to listen to the song. For a user that wants to record several of his audio CDs, it may take hours for the user to convert all of the songs on the audio CDs into digital data format.

Another common problem is that conventional approaches require the user to completely finish recording a song before beginning to record a different song or set of songs. If the user interrupts the recording before it is complete, all of the recorded data is lost and the user must start from the beginning.

SUMMARY OF THE INVENTION

In one embodiment, the present invention is a method for recording and playing data. The method comprises incrementally recording a first set of data, and incrementally playing a second set of data wherein the incremental playing of the second set of data begins while incrementally recording the first set of data.

Another embodiment of the present invention is a play while record system. The play while record system comprises a first device, a second device, a record module configured to record on the second device a first stream representing a first set of data from the first device, and a play module configured to play a second stream representing a second set of data from the second device wherein the play module plays the second stream while the record module records the first stream.

Another embodiment of the present invention is a method for playing and simultaneously recording streams of audio data. The method comprises receiving a first stream of audio data from a first set of audio data; encoding the first stream of audio data to produce a first encoded stream of audio data; encrypting the first encoded stream of audio data to produce a first encrypted, encoded stream of audio data; saving the first encrypted, encoded stream of data to a first data file in a first storage location; reading a second encrypted, encoded stream of audio data from a second data file in a second storage location wherein the reading of the second encrypted, encoded stream of audio data begins while encoding the first stream of audio data; decrypting the second encrypted, encoded stream of audio data to produce a second encoded stream of audio data; and using a streaming audio player to play the second encoded stream of audio data.

Another embodiment of the present invention is a method for playing and recording audio data at the same time. The method comprises recording audio data and playing the recorded audio data wherein the playing of the recorded audio data begins while recording the audio data.

Another embodiment of the present invention is a method for processing audio data. The method comprises stream recording audio data, and stream playing the recorded audio data wherein the stream playing of the stream recorded audio data begins before the stream recording of the audio data is finished.

Another embodiment of the present invention is a method for testing a CD-ROM drive to determine whether the CD-ROM drive can read fast enough to allow playable record, the method comprises, determining whether a CD-ROM drive has the capability to digitally extract data, determining whether the CD-ROM drive can digitally extract data above a threshold rate, and determining whether the CD-ROM drive can digitally extract without errors.

Another embodiment of the present invention is a method for testing a CD-ROM drive to determine whether the CD-ROM drive can digitally extract without errors. The method comprises reading a set of data without using any error correction techniques and storing the first set of read data, reading the same set of data using at least one error correction technique and storing the second set of read data, comparing the first set of read data with the second set of read data, and determining whether differences between the first set of read data and the second set of read data exceed a threshold value.

For purposes of summarizing the invention, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

DETAILED DESCRIPTION

A system and method which represent one embodiment and an example application of the invention will now be described with reference to the drawings. Variations to the system and method which represent other embodiments will also be described. In one disclosed embodiment, the system and method are used to begin playing a recorded set of data before the recording of the set of data has been completed.

For purposes of illustration, one embodiment will be described in the context of playable record system that records files from a CD-ROM drive into an encoded data format and may begin playing the recorded files using an audio playback system, such as, for example, RealJukebox™, even before the recording has finished. While the inventors contemplate that the present invention is not limited by the type of data that is recorded and played and that the types of data may include video, audio, audio-visual, slideshow, image and text, and so forth, the figures and descriptions relate to an embodiment of the invention using audio data. Furthermore, the details of the playable record system and of specific implementations are set forth in order to illustrate, and not to limit, the invention. The scope of the invention is defined by the appended claims.

These and other features will now be described with reference to the drawings summarized above. The drawings and the associated descriptions are provided to illustrate embodiments of the invention, and not to limit the scope of the invention. Throughout the drawings, reference numbers are re-used to indicate correspondence between referenced elements. In addition, the first digit of each reference number indicates the figure in which the element first appears.

I. Overview

Figure 1:
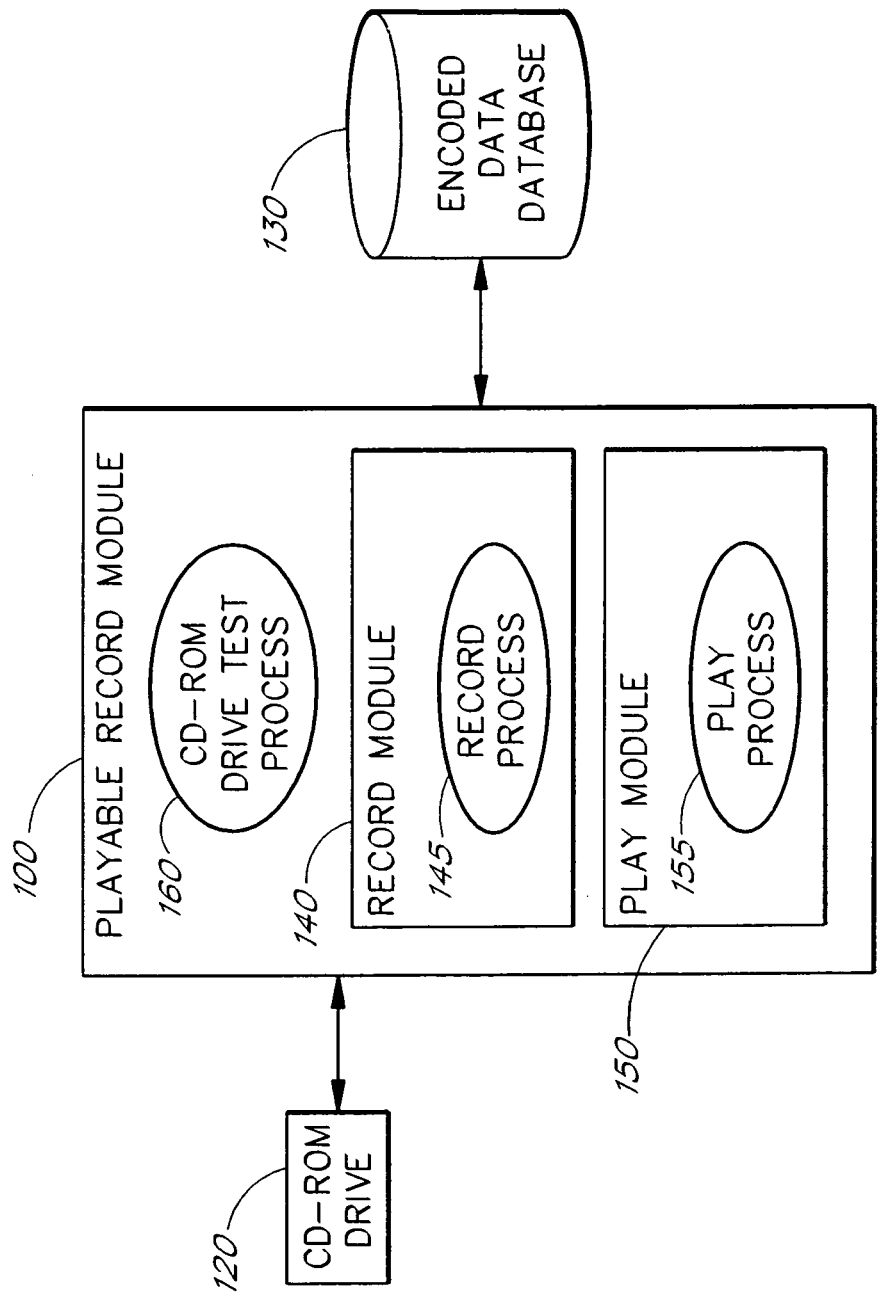
FIG. 1 illustrates a high-level block diagram of one embodiment of the present invention.

An overview of one embodiment of a playable record system is shown in FIG. 1. In that embodiment, a playable record module 100 communicates with a CD-ROM drive 120 as well as an encoded data database ("EDD") 130. In addition, the playable record module 100 includes two primary components, a record module 140 and a play module 150. The record module 140 includes a record process 145; and the play module 150 includes a play process 155. The playable record module 100 also includes a CD-ROM drive test process 160. While the record module 140 and play module 150 are implemented as separate components, it is recognized that in other embodiments, the record module 140 and the play module 150 may be implemented as a single component. In addition, the playable record module 100 may also contain additional processes. As indicated above, while the inventors contemplate that the present invention is not limited by the type of data to be played and recorded, and that the types of data include video, audio, audio-visual, slideshow, image, and text, the figures and descriptions relate to an embodiment of the invention using audio data.

As used herein, the word module, whether in upper or lower case letters, refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware.

In one embodiment, the playable record module 100 incrementally reads an audio CD file from the CD-ROM drive 120, converts the audio CD file into encoded data, incrementally stores the encoded data in the EDD 130, and incrementally plays the encoded data. In this embodiment, the audio file is processed in incremental blocks. The incremental blocks may vary in size and may be, for example, a set of 2358 bytes or 8192 bytes, as well as any other sizes of blocks.

Figure 2:
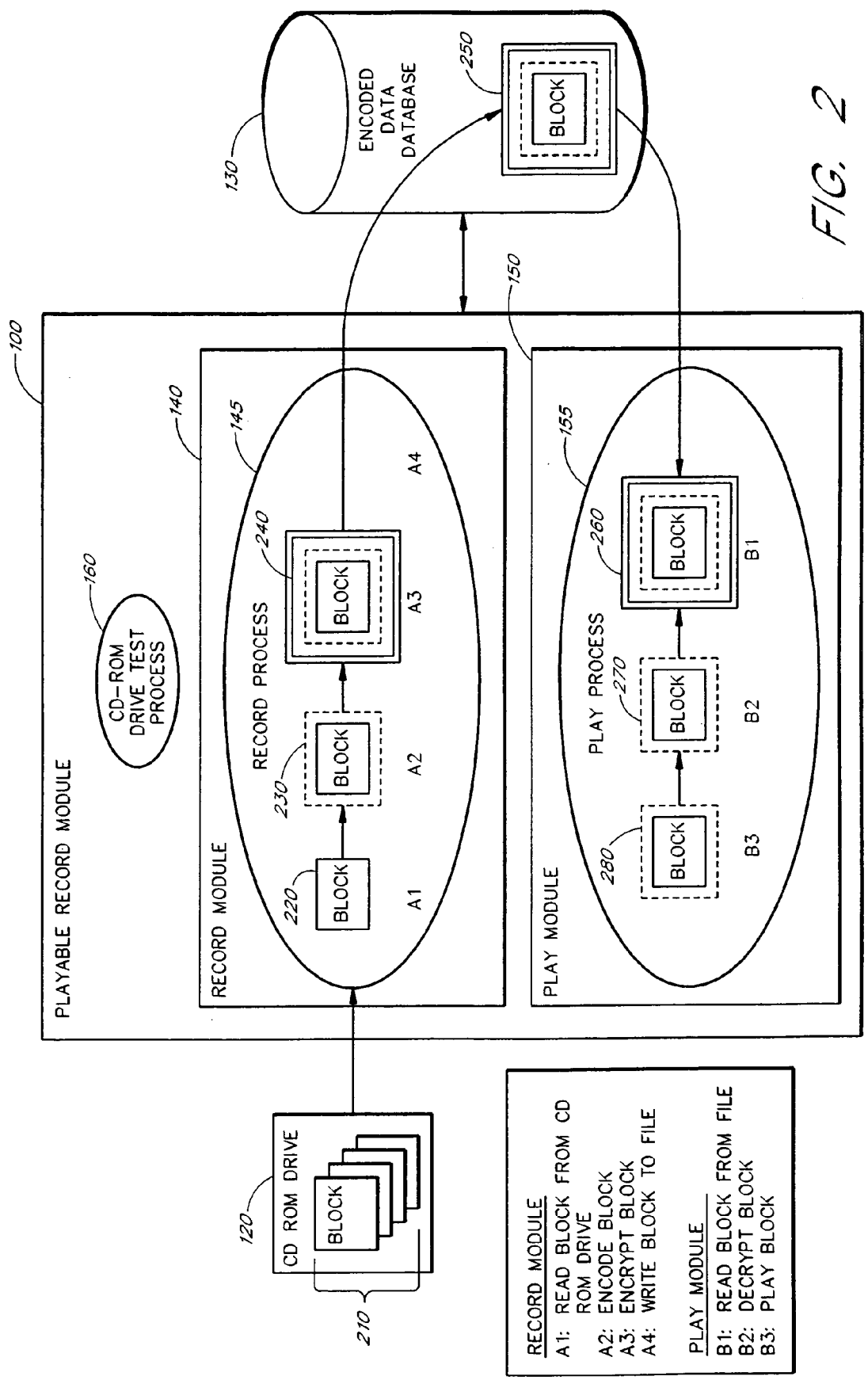
FIG. 2 illustrates a high-level block diagram of one embodiment of the present invention showing the flow of information among the CD-ROM drive, the playable record module, and the encoded data database.

FIG. 2 illustrates the flow of information for playing and recording a block of one audio file recorded from an audio CD file 210. With reference to an event A1, the record module 140 reads a block of audio CD data 220 from the CD-ROM drive 120. In an event A2, the record module 140 encodes the block of data 230. Next, in an event A3, the record module 140 encrypts the block of encoded data 240. In an event A4, the record module 140 writes the block of encrypted encoded data 250 to the EDD 130. At some time after the block has been recorded, the play module 150, in an event B1, reads the block of encrypted encoded data 260 from the EDD 130. Next, in an event B2, the play module 150 decrypts the encrypted encoded block of data 270. In an event B3, the play module 150 "plays" the block of encoded data 280.

Figure 3:
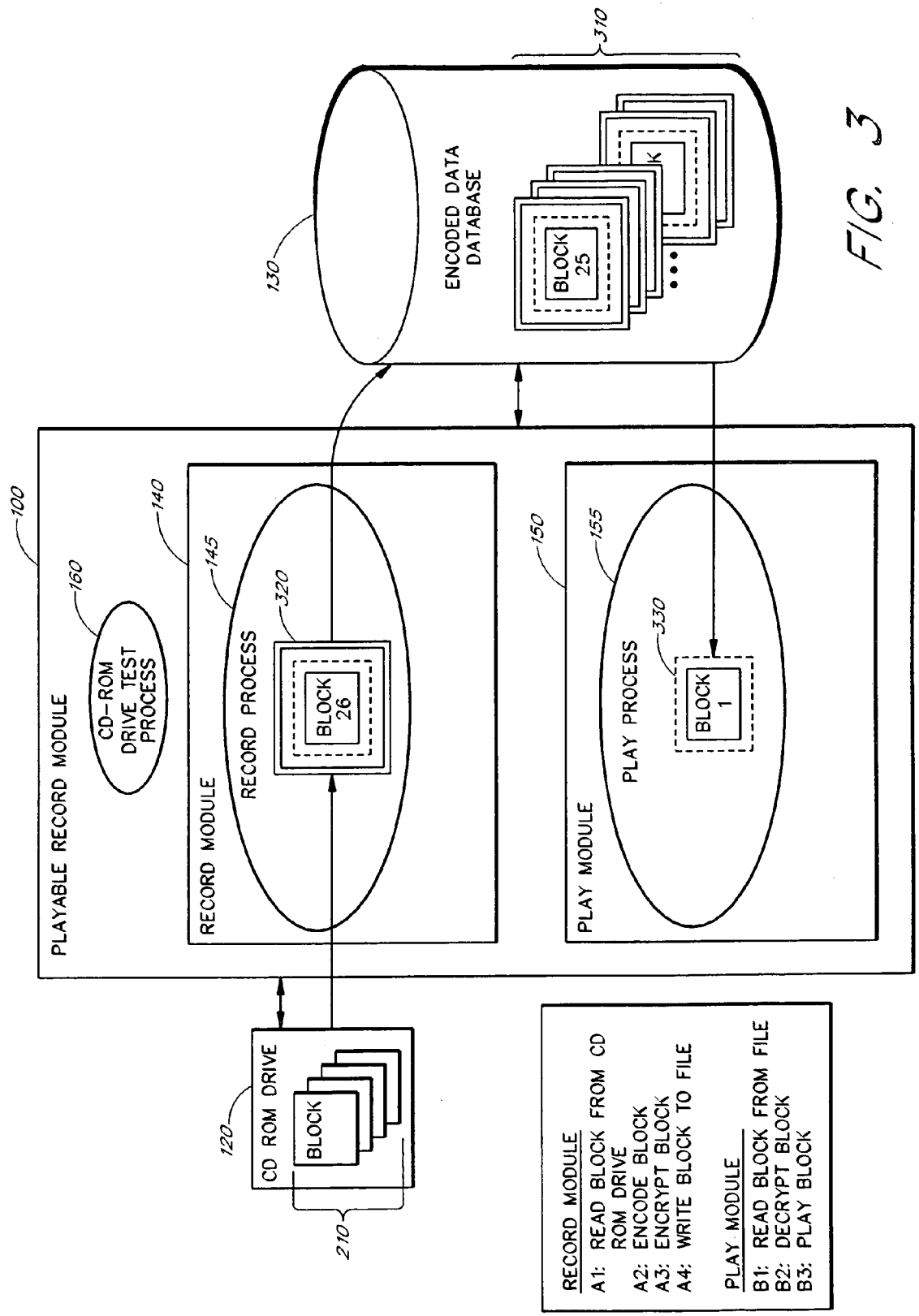
FIG. 3 illustrates a high-level block diagram of one embodiment of the present invention showing the flow of information at a single time instance among the CD-ROM drive, the playable record module, and the encoded data database.

FIG. 3 illustrates one embodiment of the playable record system at a single time instance that is recording an audio CD file 210. In that embodiment, blocks 1–25 310 have already been recorded and written to the EDD 130. As block 26 320 is being recorded by the record module 140, block 1 330 is being played by the play module 150. The user is listening to the song as it is being recorded. This embodiment discloses a system that may begin playing after 25 blocks have been recorded. It will be recognized, however, that in other embodiments, the number of blocks that are recorded before the song begins "playing" may differ according to various factors such as CD-ROM drive speed, encoding type, encryption algorithm, file write speed, encoded database size and make, audio player type, as well as other factors.

One benefit of this embodiment is that the playable record module 100 may begin "playing" a block of the encoded data soon after the block has been recorded even if the entire audio CD file has not been completely recorded. This allows the play module 150 to play one block of encoded data as the record module 140 is recording another block of audio CD data. The system may play part of the same song it is recording.

Another benefit of this embodiment is that the playable record module 100 is able to record an audio CD file in less time than it takes to play the encoded data file. Thus, by the time the encoded data file is finished playing, the record module 140 has finished recording the audio CD file, and, if desired, may have already begun recording another audio CD file.

An additional benefit of this embodiment is that the playable record module 100 allows the user to stop the recording of one audio CD file and begin the recording of another audio CD file. The recorded portion of the first audio CD file is saved such that the user may resume recording the first audio CD file at a later time without having to "re-record" the portion of the audio CD file that has already been recorded. When the user elects to return to the first audio CD file, the playable record module 100 determines what portion was already recorded and may resume recording where it left off.

Another benefit of this embodiment is that the playable record module 100 does not require the user to wait as the songs are being recorded; the user has immediate and direct access to play the songs. For example, suppose a user chooses to listen to song A. As the user listens to song A, the user is actually listening to the encoded data file version of song A as song A is being recorded from the audio CD file version of song A to the encoded data file version of song A. Next, suppose the user chooses to stop listening to song A and selects song B instead. As the user listens to the song B, the user is actually listening to the encoded data file version of B as song B is being recorded from the audio CD file version of song B to the encoded data file version of song B. If the user then returns to listen to song A, the playable record module 100 may play the encoded data file version of song A from the beginning as it resumes the recording where it left off. From the user's perspective, the recording occurs as the user listens to the music and does not require long periods of "wait" time.

II. Implementation of a Playable Record Module

This section provides further description of one embodiment of a system that plays while recording as shown in FIG. 1. The embodiment includes a playable record module 100, a CD-ROM drive 120, and an encoded data database 130.

A. Playable Record Module

The playable record module 100 includes two primary modules, the record module 140 and the play module 150. While the record module 140 and play module 150 are implemented as separate components, it is recognized that in other embodiments, the record module 140 and the play module 150 may be implemented as a single component.

1. Record Module

FIG. 1 illustrates one embodiment of the record module 140 that records audio files from audio CD data to a variety of encoded data formats. The record module 140 includes the record process 145. For a more detailed description on the record process 145, see the section below entitled "The Play While Recording Process—The Record Process."

2. Play Module

FIG. 1 illustrates one embodiment of the play module 150 that plays a song from an encrypted encoded data file. The play module 150 includes the play process 155. For a more detailed description of the play process 155, see the section below entitled "The Play While Recording Process—The Play Process."

B. CD-ROM Drive

In one embodiment, the playable record module 100 records songs stored in audio files on a compact disc (CD) that is accessed through a standard CD-ROM drive 120. While this embodiment records songs from a standard CD-ROM drive 120, it is recognized that, in other embodiments, the songs may be recorded from other storage media such as, for example, a read/write CD drive, a Digital Video Disc ("DVD") drive, a hard drive, remote storage via network or wireless connection, a download file connection, a streaming file connection, and so forth. In addition, the data recorded may include other types of data in addition to audio data such as, for example, video, audio-visual, slide show, image, text, and so forth.

C. Encoded Data Database

In one embodiment, the system may include an encoded data database ("EDD") 130 as illustrated in FIG. 1. In this embodiment, EDD 130 maintains the encoded data files. Furthermore, the EDD 130 may include information about the encoded data files, such as, for example, the name of the song, the size of the song, the artist name, the CD or album name, the playtime length, the encoded data format, the encryption type, and so forth. In addition, the EDD 130 may include information about partially recorded data files, such as, for example, the name of the song, the size of the song, the number of bits/bytes/blocks recorded, the block size, the date of the last recording, and so forth. The EDD 130 may include other information pertaining to the encoded data files.

In connection with the EDD 130, in one embodiment, there may be several processes (not shown) such as ID generators, number generators, statistic generators, and so forth that work in concert with the database.

In one embodiment, the EDD 130 is implemented using CodeBase, a semi-relational database offered by Sequiter. CodeBase is a high-speed xBase-compatible database engine that works with C/C++, Visual Basic, Delphi and Java under standalone and client/server environments. It is recognized that the EDD 130 may be implemented using a different type of relational database, such as Sybase, Oracle, Microsoft® SQL Server, and so forth as well as other types of databases such as, for example, a flat file database, an entity-relationship database, and object-oriented database, a record-based database, and so forth. Moreover, while the EDD 130 depicted in FIG. 1 is implemented as a single database, it is recognized that in other embodiments, the EDD 130 may be implemented as a set of databases or as other data structures well known in the art such as tables, trees, linked lists, and so forth.

III. The Playable Record Module Processes

The playable record module 100 includes a record module 140 with a record process 145, a play module 150 with a play process 155, and a CD-ROM drive test process 160.

A. The Record Process

Figure 4:
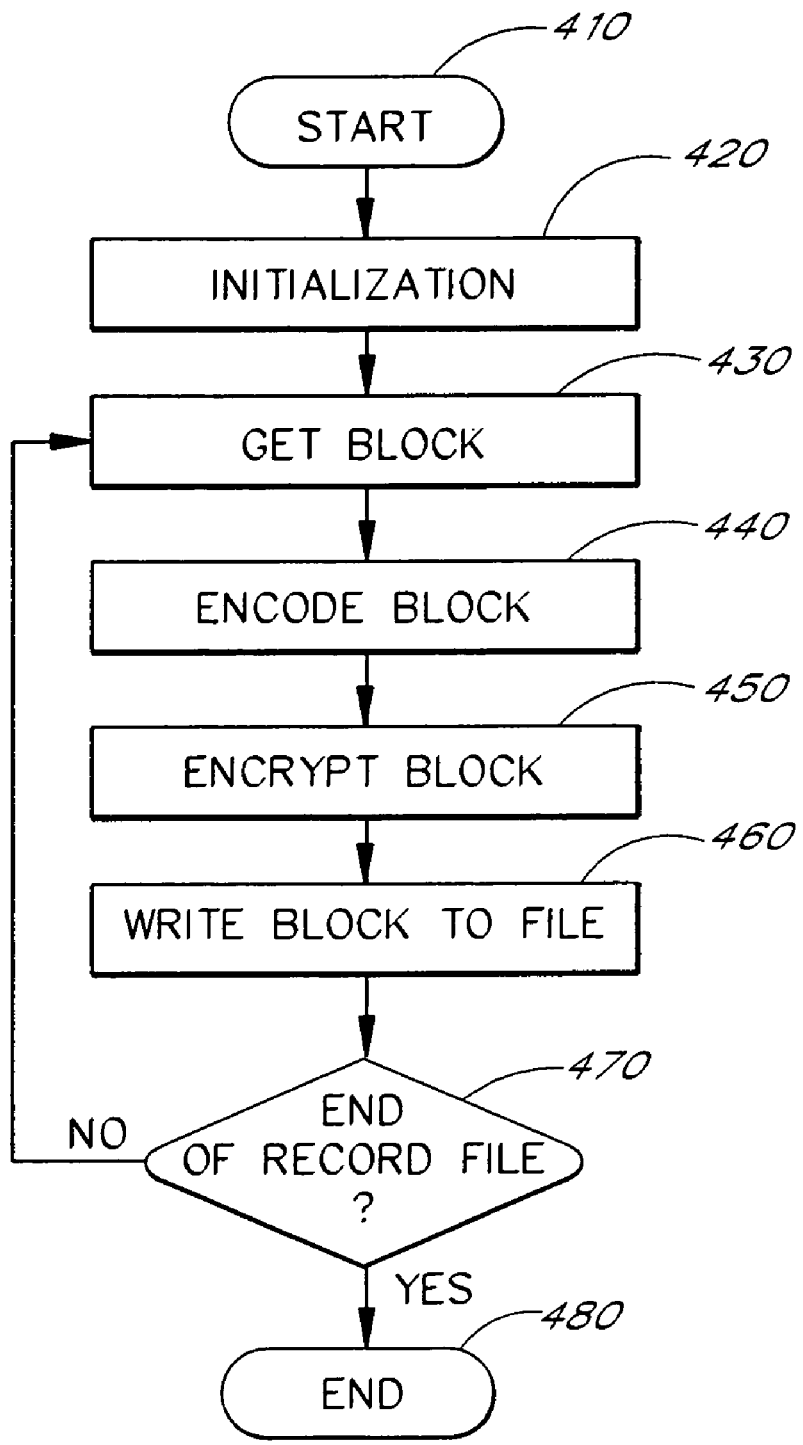
FIG. 4 illustrates a flowchart of one embodiment of recording a file.

One embodiment of the record process 145 is illustrated in FIG. 4. Beginning at a start state 410, the record process 145 proceeds to an initialization state 420. During the initialization state 420, the record process 145 may obtain information about the CD-ROM drive 120, the size of the music file, information about the song (e.g., title, artist, album, etc.), as well as other information. This CD-ROM drive information may be obtained, for example, from the CD-ROM drive 120, from a local database of CD-ROM drive information, from a remote database of CD-ROM drive information, from user input, and so forth. The record process 145 may also calculate the number of blocks in the file, determine whether a portion of the file has already been recorded, determine the encoding format, determine the encryption format, and so forth. The music file information may be obtained, for example, from the CD-ROM file, from a local database of CD information, from a remote database of CD information, from user input, and so forth. The record process 145 then proceeds to a get block state 430, wherein the record process 145 reads the first block of audio CD data from the CD-ROM drive 120 and proceeds to an encode block state 440.

In one embodiment, the record process 145 may perform functions on the data (not shown). For example, the record process 145 may convert the block of data from analog to digital, use error correction techniques to condition the data, and so forth.

In the encode block state 440, the record process 145 encodes the block using the appropriate encoding technique and proceeds to an encrypt block state 450. The encoding technique may be selected by the user, selected by the record process 145, hard coded into the record module 140, or determined by other modules. In one embodiment, the record process 145 translates the audio file into an encoded data format such as, for example, an MP3 file, a G2 file, a WAV file, an ACWMA file, and so forth. In one embodiment, the encoding process may use, for example, the Xing MP3 encoder, the RealProducer encoder, the WMA encoder, or a combination of various encoding techniques. In addition, the encoding process may include encoding techniques that allow the record module 140 to encode in multiple file formats. For example, the user may elect to record into MP3 format for song A, G2 format for song B, and both MP3 format and G2 format for song C.

In the encrypt block state 450, the record process 145 encrypts the block using the appropriate encryption technique and proceeds to a write block state 460. The encryption technique may be selected by the user, selected by the record process 145, hard coded into the record module 140, or determined by other modules. In one embodiment, the record process 145 encrypts the encoded data to prevent unauthorized access. It is recognized that a variety of encryption techniques may be used. For example, the encryption process may use symmetric key encryption, asymmetric encryption, a combination of both symmetric encryption and asymmetric encryption, other methods of encryption, or no encryption at all. In addition, the encryption process may utilize multiple encryption techniques. In one embodiment, the encryption process uses well-known encryption algorithms such as the Counterpane Lab's Twofish encryption algorithm or Microsoft's Crypto API. For a detailed description on encryption, please refer to "Applied Cryptography: Protocols, Algorithms, and Source code in C, Second Edition," by Bruce Schneier, published by John Wiley & Sons, 1996.

In the write block state 460, the record process 145 writes the block to a file in the EDD 130 and proceeds to a state 470. In one embodiment, the record process 145 uses standard file writing techniques and identifies the portion of the encrypted encoded data that has been written to the file. It will be appreciated that a file pointer, byte offset, bit offset, or block offset, along with a file identifier may be used to identify the written portion. This information may be used by the record module 140 to finish recording a partially-recorded song.

In the state 470, the record process 145 determines whether it is at the end of the file. If not, the record process 145 proceeds to the get block state 430 and continues until it has recorded every block of the file. Once all blocks of the file have been recorded, the record process 145 proceeds to an end state 480.

It is recognized that while FIG. 4 illustrates a record process 145 that records an entire file, in one embodiment, the record process 145 may be interrupted such that only a portion of the song is recorded. For example, the user may interrupt the record process 145 and the record process 145 may store information on the interrupted recording allowing the user to resume recording at a later time. This interrupted recording information may include data such as, for example, the number of blocks recorded, the block size, the encoding technique, the encryption method, if any, the date recorded, and so forth.

FIG. 4 illustrates one embodiment of the record process 145. In other embodiments, the record process 145 may be implemented in a different manner. For example, in other embodiments the record process 145 may be implemented in combination with one or more other process, and/or additional processes (not shown) may also be used by the record module 140. In addition, in other embodiments, portions of the record process 145 may be omitted, such as, for example, the initialization state 420 and/or the encrypt block state 450.

B. The Play Process

Figure 5:
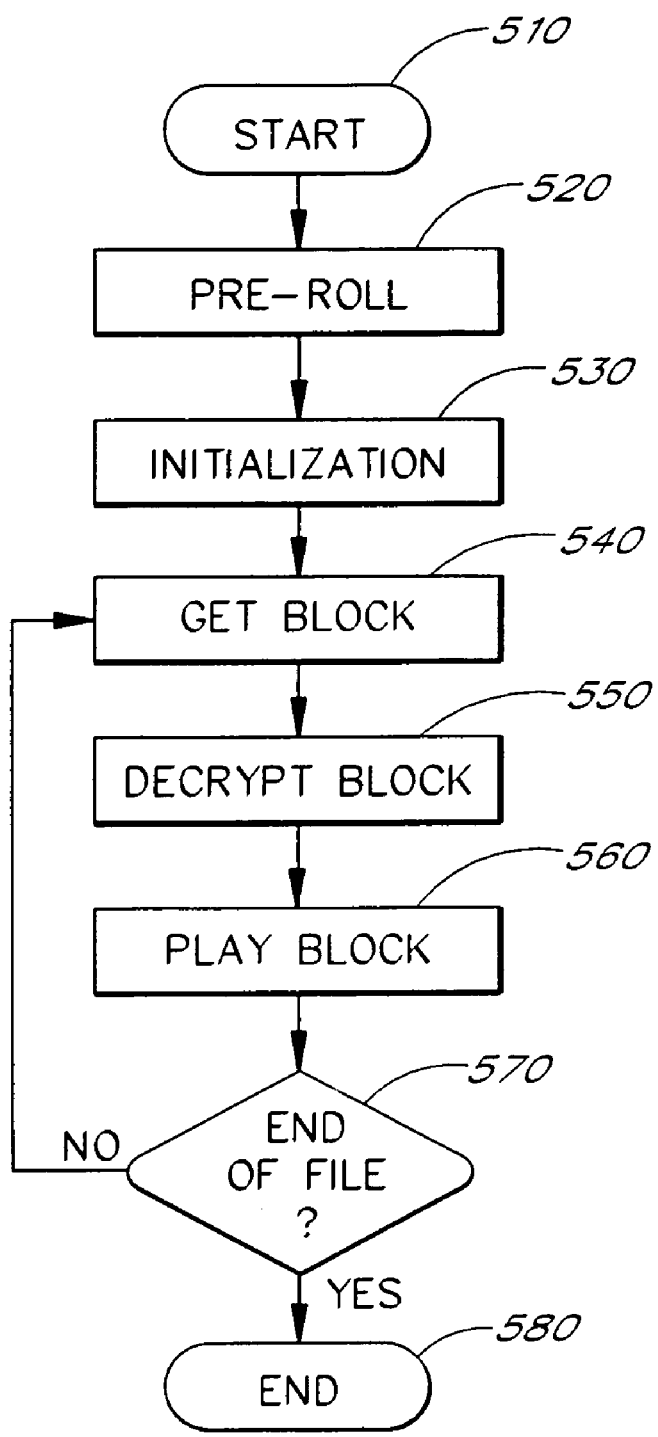
FIG. 5 illustrates a flowchart of one embodiment of playing a file.

One embodiment of the play process 155 is illustrated in FIG. 5. Beginning at a start state 510, the play process 155 proceeds to a pre-roll state 520. In the pre-roll state 520, the play process 155 determines if enough blocks have been recorded such that the process may continue to an initialization state 530. To determine whether enough blocks have been recorded to begin playback, the play process 155 may perform a database lookup of the type of encoding and encryption formats; the play process 155 may perform calculations in real-time; the play process 155 may attempt to fill a pre-designated buffer; and so forth. In the initialization state 530, the play process 155 retrieves information about the song such as, for example, the song title, artist, song length, CD, and so forth. Proceeding to a get block state 540, the read process reads a block of data from the EDD 130 and proceeds to a decrypt block state 550.

In the decrypt block state 550, the play process 155 decrypts the block of data using the appropriate decryption algorithm and proceeds to a play block state 560. The play process 155 may use one or more of a number of methods to determine the appropriate decryption algorithm that corresponds to the type of encryption algorithm used, such as, for example, storing the type of encryption used in the EDD 130, naming the file with an encryption type code, implementing the playable record module 100 with a single encryption algorithm, and so forth. In one embodiment, the decryption process may utilize a variety of well-known decryption algorithms depending on how the data was encrypted. For example, the decryption process may use symmetric key decryption, asymmetric decryption, a combination of both symmetric decryption and asymmetric decryption, other methods of decryption, or no decryption at all. In addition, the decryption process may utilize multiple decryption techniques allowing the play module 150 to decrypt different types of encrypted data. In one embodiment, the decryption process uses well-known decryption algorithms such as the Counterpane Lab's Twofish decryption algorithm or Microsoft's Crypto API.

In the play block state 560, the play process 155 plays the encoded block of data using the appropriate audio file player and proceeds to a state 570. The play process 155 may use a number of methods to determine the appropriate audio file player that corresponds to the type of encoding technique used, such as, for example, storing the type of encoding technique used in the EDD 130, naming the file with an encoding technique code, implementing the playable record module 100 with a single encoding technique, and so forth. In one embodiment, the play process 155 may recognize a variety of encoding formats and may utilize one or more encoded data players that decode and play different encoded formats. This allows the play process 155 to play songs that have been recorded in different formats. The play process 155 may recognize various encoded data formats such as, for example, MP3, G2, WAV, ACWMA, and so forth. For example, the play process 155 may recognize that a song is in a G2 format and use the RealAudio Player, by RealNetworks, Inc., to decode and play the encoded data. While multiple encoding formats are utilized in this embodiment, it is recognized that in some embodiments a single encoding format may be used.

In the state 570, the play process 155 determines whether it has reached the end of the file. If not, the play process 155 proceeds to the get block state 540 and reads another block of data from the file. Once the entire song has been played, the play process 155 proceeds to an end state 580.

FIG. 5 illustrates one embodiment of a play process 155 that plays an entire file. In another embodiment, the play process 155 may be interrupted by the user such that only a portion of the song is played.

It is recognized that FIG. 5 illustrates one embodiment of the play process 155. In other embodiments, the play process 155 may be implemented in a different manner. For example, in other embodiments, the play process 155 may be implemented in combination with one or more other processes, and/or additional processes (not shown) may also be used by the play module 150. In addition, in other embodiments, portions of the play process 155 may be omitted, such as, for example, the decrypt block state 550, the pre-roll state 520, and/or the initialization block state 530. For example, the play process 155 may be triggered by the record state 520 once enough blocks were recorded such that the pre-roll state 520 may be omitted. In another embodiment, the pre-roll process may be included as part of the record process 145, as part of an independent process, or as part of a different module. Furthermore, the initialization state 530 may be executed before the pre-roll state 520.

It is also recognized that while both the record process 145 and the play process 155 process music files incrementally, it is not necessary that the increments of data are the same size. For example, in one embodiment, the record module 140 may record blocks of size X while the play module 150 uses blocks of size Y. In another embodiment, both the record module 140 and the play module 150 may record and play blocks of size Z.

C. CD-ROM Drive Test Process

In one embodiment, the playable record module 100 includes a CD-ROM drive test process ("test process") 160. The test process 160 queries the CD-ROM drive 120 to determine whether or not the CD-ROM drive 120 is capable of providing data at a rate that allows the record process 145 to run at least as fast as the play process 155. The test process 160 may perform several tests to set various flags that can be used by the playable record module 100. For example, the test process 160 determines whether or not the CD-ROM drive 120 can handle digital extraction. If so, then the record module 140 may perform as illustrated in FIG. 4. If not, then the record module 140 may have to perform an analog to digital conversion before the block of data can be encoded and encrypted. While this embodiment uses "Digital" and "Error Correction" flags in the test process 160, it is recognized that in other embodiments, other flags and/or methods may be used. For example, the record process 145 may, by default, attempt to convert from analog to digital until it recognizes the data as digital data, and so forth.

Figure 6:
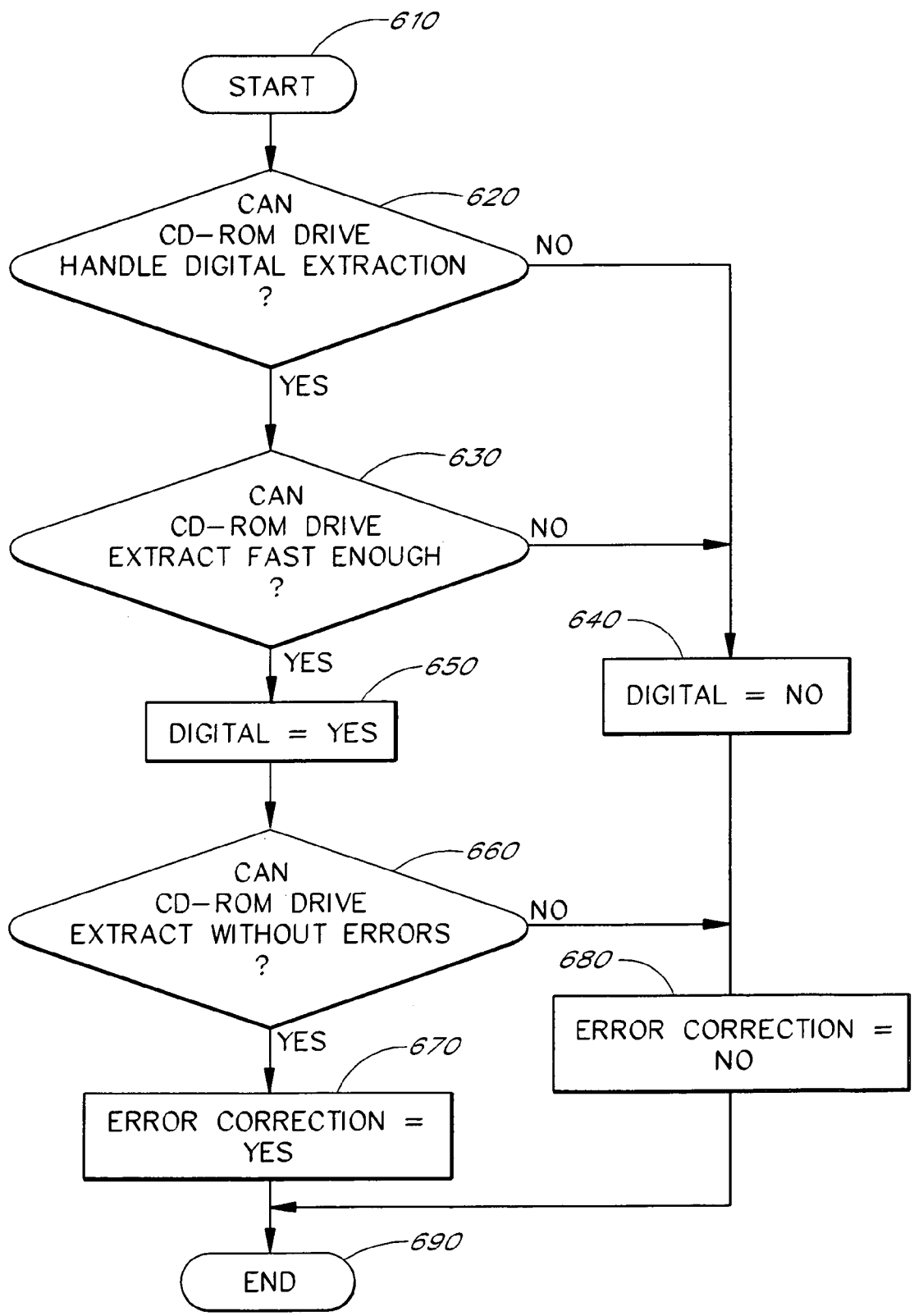
FIG. 6 illustrates a flowchart of one embodiment of initializing the CD-ROM drive.

FIG. 6 is a flowchart representing states comprising one embodiment of the test process 160. Beginning at a start state 610, the test process 160 proceeds to a state 620, wherein the test process 160 determines whether the CD-ROM drive 120 is capable of handling digital extraction. Such determination may be made, for example, using a database look up of the CD-ROM drive 120 model and make, short run time tests, as well as a variety of other methods. If the CD-ROM drive 120 is capable of handling digital extraction, then the test process 160 proceeds to a state 630; if not, then the test process 160 sets the "Digital" flag to NO in a state 640. In the state 630, the test process 160 determines whether the CD-ROM drive 120 can extract fast enough to permit playing while recording. If the CD-ROM drive 120 is not fast enough, the test process 160 proceeds to the state 640, sets the "Digital" flag to NO, and proceeds to a state 680. If the CD-ROM drive 120 is fast enough, the test process 160 proceeds to a state 650, sets the "Digital" flag to YES, and proceeds to a state 660. In state 660, the test process 160 determines whether the CD-ROM drive 120 can extract without errors.

Figure 7:
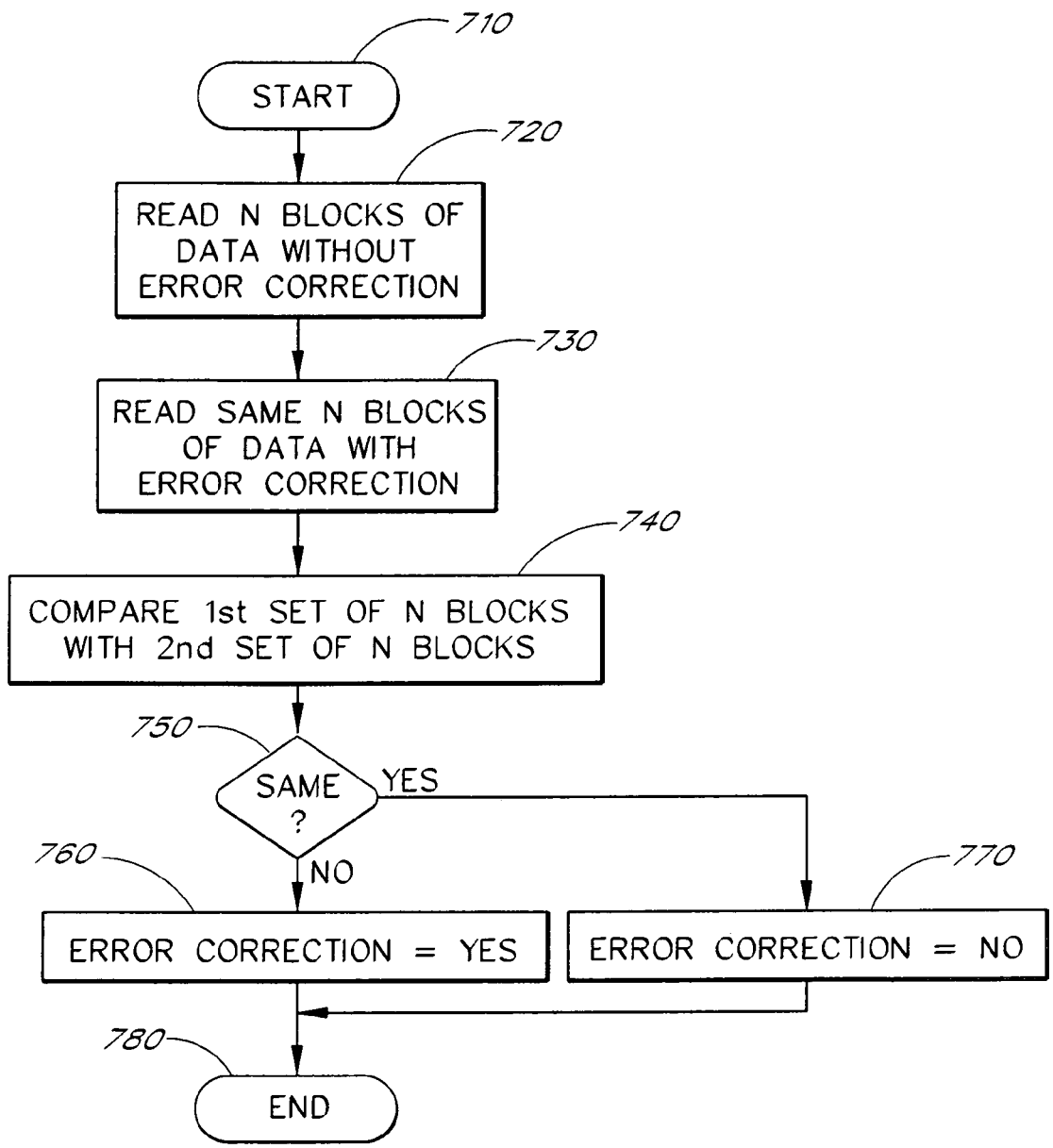
FIG. 7 illustrates a flowchart of one embodiment of determining whether to use error correction.

One embodiment of an error determination process is illustrated in FIG. 7 and is described below. If the CD-ROM drive 120 can extract without errors, then the test process 160 proceeds to a state 670, wherein the "Error Correction" flag is set to YES, and the test process 160 proceeds to an end state 690. If the CD-ROM drive 120 can not extract without errors, the test process 160 proceeds to a state 680 wherein the "Error Correction" flag is set to NO and the test process 160 then proceeds to the end state 690.

FIG. 7 is a flow chart representing states comprising one embodiment of the error determination process. Beginning at a start state 710, the error determination process proceeds to a state 720 wherein the error determination process reads N blocks of data without using any error correction mode and then proceeds to a state 730. In the state 730, the error determination process reads the same N blocks of data with error correction mode and proceeds to a state 740. In the state 740, the error determination process compares the first set of data with the second set of data and proceeds to a state 750. In the state 750, the error determination process checks to see if there is a difference between the first set of data and the second set of data. If there is a difference, then the error determination process assumes that there is an error and proceeds to a state 760 wherein the "Error Correction" flag is set to YES, and the error determination process proceeds to an end state 780. Otherwise, if there is no difference, then the error determination process assumes that there are no errors and proceeds to a state 770 wherein the "Error Correction" flag is set to NO. The error determination process then proceeds to an end state 780. It is recognized other embodiments may use different methods of determining whether or not error correction should be used.

At the end of the CD-ROM test process 160, it will have been determined whether or not the CD-ROM drive 120 can handle digital extraction fast enough and whether or not error correction is allowed. If the CD-ROM drive 120 can perform digital extraction fast enough and error correction is allowed, then the CD-ROM drive 120 may support the playable record process 145. If the CD-ROM drive 120 can not perform digital extraction fast enough and error correction is not allowed, then the CD-ROM drive 120 may not support the playable record process 145.

While this embodiment uses two flags in the test process 160, it is recognized that in other embodiments, additional, fewer, or different flags may be used to add to or modify the test process 160. In one embodiment, the test process 160 may be run a single time prior to play and record operations, each time a new playable record module 100 is installed, and/or when a new CD-ROM drive 120 is added to the system. While, in this embodiment, the test process 160 is part of the playable record module 100, it is recognized that in other embodiments the test process 160 may be part of another module such as the installation module and so forth.

While this embodiment depicts a test process for a CD-ROM drive, it is recognized that in other embodiments similar test processes may be used in conjunction with other types of CD-ROM drives as well as other media with the goal being to assess sufficient digital extraction speed and error corrections capability. The other types of media may include, for example, read/write CD drives, DVD drives, hard disk, remote storage via network or wireless connection, and so forth.

IV. Conclusion

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A method comprising:
   indicating rendering of stored audio data of an audio data file being stored onto a storage medium;
   receiving a stream of a first audio data file stored on an optical disk being processed by an optical disk reader device;
   incrementally storing the first audio data file onto a first storage medium, starting at a first location corresponding to a beginning of the first audio data file stored on the optical disk, the first storage medium being separate and distinct from both the optical disk and the optical disk reader device; and
   if rendering of stored audio data of an audio data file being stored onto a storage medium is indicated, incrementally rendering at least a portion of the stored first audio data file from the first storage medium, prior to completion of the storing in the first storage medium of all the first audio data file.

2. The method of claim 1, wherein the incrementally rendering of at least some of the stored first audio data from the first storage medium is performed at real time.

3. The method of claim 1, further comprising encoding the first audio data as they are received, prior to them being stored, wherein the first audio data is received, encoded, and stored at a rate that is greater than real-time.

4. The method of claim 3, wherein the incrementally rendering of at least some of the stored first audio data is performed at real time.

5. The method of claim 1, further comprising:
   stopping said receiving and storing, at a second point within the first audio data file;
   receiving from the optical disk reader device, second audio data streamed from a second audio data file stored on the audio optical disk;
   incrementally storing the second audio data file onto a second storage medium starting at a second location corresponding to a beginning of the second audio data file, and
   incrementally rendering at least some of the stored second audio data from the second storage medium, prior to completion of the storing of all the second audio data onto the second storage medium.

6. The method of claim 5, wherein the incrementally storing of the first audio data is to a local storage device, as an electronic data file.

7. The method of claim 6, wherein the incrementally storing of the second audio data is to the same local storage device, as part of the same electronic data file.

8. The method of claim 1, wherein the first audio data optical file further comprises metadata.

9. The method of claim 1, wherein the optical disk comprises a compact disk (CD).

10. The method of claim 1, wherein
    the incrementally storing of the first audio data comprises incrementally storing the first audio data in one of a plurality of digital encoding formats;
    the method further comprises identifying in accordance with which one of the plurality of data encoding formats the first audio data is encoded; and
    the incrementally rendering comprises decoding blocks of the stored first audio data, based at least in part on the result of said identifying.

11. The method of claim 1, wherein if rendering of stored audio data of an audio data file being stored onto a storage medium is not indicated, not rendering at least a portion of the stored first audio data from the first storage medium, prior to completion of the storing of all of the first audio data file onto the first storage medium.

12. The method of claim 1, wherein the optical disk reader device and the first storage medium are co-disposed in a same device.

13. A computer readable medium comprising
    a medium; and
    instructions stored on the medium, wherein the instructions when executed, enable an apparatus to perform a method comprising:
       indicating rending of stored audio data of an audio data file being stored onto a storage medium,
       receiving from an optical disk reader device, first audio data streamed from first audio data file stored on an optical disk being processed by the optical disk reader device;
       incrementally storing the first audio data file onto a first storage medium starting at a first location corresponding to a beginning of the first audio data file, wherein the first storage medium is separate and distinct from both the optical disk as well as the optical disk reader device; and
       if rendering of stored audio data of an audio data file being stored onto a storage medium is indicated, incrementally rendering at least some of the stored first audio data from the first storage medium, prior to completion of the storing of all the first audio data onto the first storage medium.

14. The computer readable medium of claim 13, wherein the instructions are adapted to enable the apparatus to incrementally render the first audio data at real time.

15. The computer readable medium of claim 13, wherein the method further comprises encoding the first audio data prior to their storing, wherein the first audio data is received, encoded and stored at a rate that is greater than real-time.

16. The computer readable medium of claim 15, wherein the instructions are adapted to enable the apparatus to incrementally render the first audio data at real time.

17. The computer readable medium of claim 13, wherein the method further comprises:
    stopping the storing of the first audio data at a second location within the first audio data file;

receiving from the optical disk reader device, second audio data streamed from a second audio data file stored on the optical disk;

incrementally storing the second audio data file onto a second storage medium; and incrementally rendering at least some of the stored second audio data from the second storage medium, prior to completion of the incrementally storing of all the second audio data onto the second storage medium.

18. The computer readable medium of claim 17, wherein the instructions are adapted to enable the apparatus to incrementally store the first audio data to a local storage device as a first electronic data file.

19. The computer readable medium of claim 17, wherein the instructions are further adapted to enable the apparatus to incrementally store the second audio data as part of the first electronic data file.

20. The computer readable medium of claim 13, wherein the first audio data file further comprises metadata.

21. The computer readable medium of claim 13, wherein the instructions are adapted to enable the apparatus to incrementally store the first audio data in one of a plurality of digital encoding formats, as well as to identify in accordance with which one of the plurality of data encoding formats the first audio data stream of data is encoded, and decode blocks of the stored first audio data.

22. An apparatus comprising:

a medium comprising a plurality of instructions, which when executed operate the apparatus to identify rendering of stored audio data of an audio data file being stored onto a storage medium;

receive from an optical disk reader device, first audio data streamed from a first audio data file stored in an optical disk being processed by the optical disk reader device, incrementally store the first audio data onto a first storage medium starting at a first location corresponding to a beginning of the first audio data file, the first storage medium being separate and distinct from the optical disk as well as the optical disk reader device, and if rendering of stored audio data of an audio data file being stored is indicated, incrementally render at least some of the stored first audio data from the first storage medium, prior to completion of the storing of all the first audio data onto the first storage medium; and a processor coupled to the medium to execute the plurality of instructions.

23. The apparatus of claim 22, wherein the apparatus further comprises a local storage device, and the instructions are adapted to operate the apparatus to store the first audio data to the local storage device, as a first electronic data file.

24. The apparatus of claim 23, wherein the first audio data file further comprises metadata.

* * * * *

UNITED STATES PATENT AND TRADEMARK OFFICE
CERTIFICATE OF CORRECTION

PATENT NO.        : 6,937,814 B1
APPLICATION NO.   : 09/549988
DATED             : August 30, 2005
INVENTOR(S)       : Jeffrey M. Chasen It is certified that error appears in the above-identified patent and that said Letters Patent is hereby corrected as shown below:

Column 12, line 35 "indicating rending of stored audio data" should be changed to --indicating rendering of stored audio data--.

Signed and Sealed this
Twenty-seventh Day of November, 2012

David J. Kappos
*Director of the United States Patent and Trademark Office*